United States Patent
Funayama (10) Patent No.: US 7,463,455 B2
(45) Date of Patent: Dec. 9, 2008

(54) MAGNETORESISTIVE HEAD HAVING FIRST AND SECOND SHIELD LAYERS BETWEEN FIRST AND SECOND LEAD LAYERS

(75) Inventor: Tomomi Funayama, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 450 days.

(21) Appl. No.: 11/200,161

(22) Filed: Aug. 10, 2005

(65) Prior Publication Data

US 2006/0044701 A1 Mar. 2, 2006

(30) Foreign Application Priority Data

Aug. 31, 2004 (JP) ............................. 2004-253278

(51) Int. Cl.
*G11B 5/39* (2006.01)
*G11B 5/11* (2006.01)
(52) U.S. Cl. ...................... 360/322; 360/319
(58) Field of Classification Search ................. 360/319, 360/322, 324.1, 324.2
See application file for complete search history.

(56) References Cited

U.S. PATENT DOCUMENTS

| | | | |
|---|---|---|---|
| 5,731,937 A * | 3/1998 | Yuan | 360/322 |
| 6,134,089 A * | 10/2000 | Barr et al. | 360/322 |
| 6,198,609 B1 * | 3/2001 | Barr et al. | 360/322 |
| 6,542,340 B1 | 4/2003 | Hayashi | |
| 6,654,209 B2 | 11/2003 | Seigler et al. | |
| 6,724,583 B2 | 4/2004 | Seigler et al. | |
| 6,754,052 B2 * | 6/2004 | Asida et al. | 360/322 |
| 6,757,143 B2 * | 6/2004 | Tunayama et al. | 360/324.1 |
| 6,807,032 B1 | 10/2004 | Seigler et al. | |
| 7,031,119 B2 * | 4/2006 | Watanabe et al. | 360/313 |
| 7,154,713 B2 * | 12/2006 | Watanabe et al. | 360/313 |
| 2002/0149887 A1 | 10/2002 | Sato | |
| 2003/0189797 A1 | 10/2003 | Arai et al. | |
| 2004/0184197 A1 | 9/2004 | Zheng et al. | |
| 2004/0264034 A1 | 12/2004 | Watanabe et al. | |
| 2005/0201018 A1 | 9/2005 | Nagai et al. | |
| 2007/0201166 A1 * | 8/2007 | Gill | 360/319 |

FOREIGN PATENT DOCUMENTS

| | | |
|---|---|---|
| JP | 2002-025016 | 1/2002 |
| JP | 2002-314165 | 10/2002 |

OTHER PUBLICATIONS

Australian Search Report dated Jun. 19, 2006 for Appln. No. 200504947-3.

* cited by examiner

*Primary Examiner*—Jefferson Evans
(74) *Attorney, Agent, or Firm*—Pillsbury Winthrop Shaw Pittman, LLP (57) ABSTRACT

A magnetic head provided with magnetoresistance effect element, the magnetic head comprises first shielding layer superimposed on one surface of the magnetoresistance effect element and whose area is larger than that of this one surface, a first lead layer formed ranging from a portion where the first shielding layer is superimposed on the magnetoresistance effect element to another portion on the first shielding layer and which applies the sense current to the magnetoresistance effect element, a second shielding layer superimposed on another surface of the magnetoresistance effect element opposite to the one surface and whose area is larger than that of the other surface, and a second lead layer formed ranging from a portion where the second shielding layer is superimposed on the magnetoresistance effect element to another portion on the second shielding layer and which applies the sense current to the magnetoresistance effect element.

12 Claims, 5 Drawing Sheets

Recessed portion

MAGNETORESISTIVE HEAD HAVING FIRST AND SECOND SHIELD LAYERS BETWEEN FIRST AND SECOND LEAD LAYERS

CROSS-REFERENCE TO RELATED APPLICATIONS

This application is based upon and claims the benefit of priority from prior Japanese Patent Application No. 2004-253278, filed Aug. 31, 2004, the entire contents of which are incorporated herein by reference.

BACKGROUND OF THE INVENTION

1. Field of the Invention

The present invention relates to a CPP (Current Perpendicular-to-the-Plane) type magnetic head, a head suspension assembly on which this magnetic head is mounted, and a magnetic reproduction apparatus.

2. Description of the Related Art

In recent years, sizes of magnetic recording apparatuses such as hard disk drives have been rapidly reduced, and recording densities have been increased. This tendency is expected to rise further. With the increase of the recording density, there is a demand for a highly sensitive sensor, and a current perpendicular to plane-GMR (CPP-GMR) element has been developed to meet this demand. By use of the CPP-GMR element, a magnetic head having high density and output can be formed.

This type of magnetic head comprises a pair of shielding layers which define a gap length, and a current supply layer (lead layer) which conducts a sense current to the CPP-GMR element. Usually, the shielding layer is formed outside the lead layer. That is, the CPP-GMR element is held between two upper and lower lead layers, and this state is held further by two shielding layers. To increase the recording density further, it is proposed that the shielding layer be also provided with a function of the lead layer (see, e.g., Jpn. Pat. Appln. KOKAI Publication No. 2002-314165). It is proposed that the lead layer is connected to the shielding layer on the other side of medium facing surface in order to shorten the gap length and enhance the recording density (see, e.g., Jpn. Pat. Appln. KOKAI Publication No. 2002-25016). In this constitution, the sense current flows through the shielding layer until the current flows through the CPP-GMR element.

Additionally, the magnetic head reads information by use of an element resistance which changes with the magnetic flux from the recording medium. However, when the sense current flows through the shielding layer, the resistance is generated even in the shielding layer. Since the shielding layer has weak magnetoresistance effects, the signal-to-noise ratio of a reproduced output is accordingly degraded. Since a tunnel magneto-resistive (TMR) element has a large element resistance, an influence of a resistance change by the shielding layer is not very conspicuous. On the other hand, since the resistance of the CPP-GMR element is very small, and a ratio of the resistance change of the shielding layer is large, noise components are easily superimposed on an output by a disturbance magnetic field. This is remarkable especially in a case where a magnetic shielding film is also used as a lead film as in a technique described in the Jpn. Pat. Appln. KOKAI Publication No. 2002-25016, and there is a demand for a certain countermeasure.

BRIEF SUMMARY OF THE INVENTION

According to an aspect of the present invention, there is provided a magnetic head which is provided with a magnetoresistance effect element where a plurality of magnetic films are laminated and which conducts a sense current in a film thickness direction of the magnetoresistance effect element, the magnetic head comprising a first shielding layer which is superimposed on one surface of the magnetoresistance effect element and whose area is larger than that of this one surface; a first lead layer which is formed ranging from a portion where the first shielding layer is superimposed on the magnetoresistance effect element to another portion on the first shielding layer and which applies the sense current to the magnetoresistance effect element; a second shielding layer which is superimposed on another surface of the magnetoresistance effect element opposite to the one surface and whose area is larger than that of the other surface; and a second lead layer which is formed ranging from a portion where the second shielding layer is superimposed on the magnetoresistance effect element to another portion on the second shielding layer and which applies the sense current to the magnetoresistance effect element. As is evident from the above description, each of the first and second lead layers has a portion that overlaps an area of the shielding layer where the shielding layer contacts the magnetoresistance effect element and a portion that overlaps an area of the shield where the shield does not contact the magnetoresistance effect element.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

Figure 1:
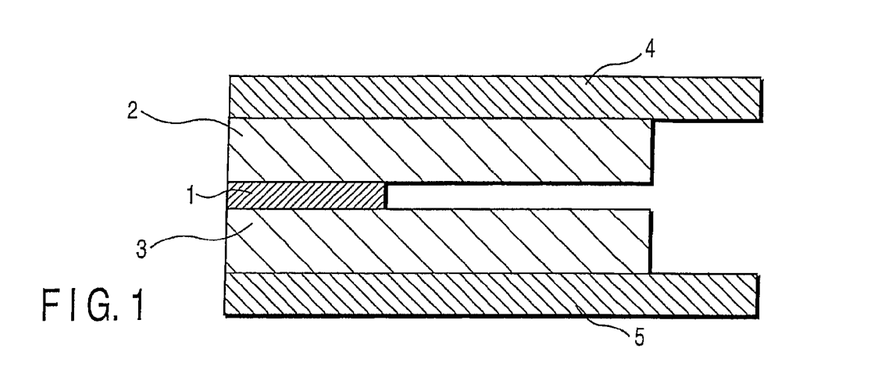
FIG. 1 is a sectional view showing a first embodiment of a magnetic head according to the present invention.
Figure 2:
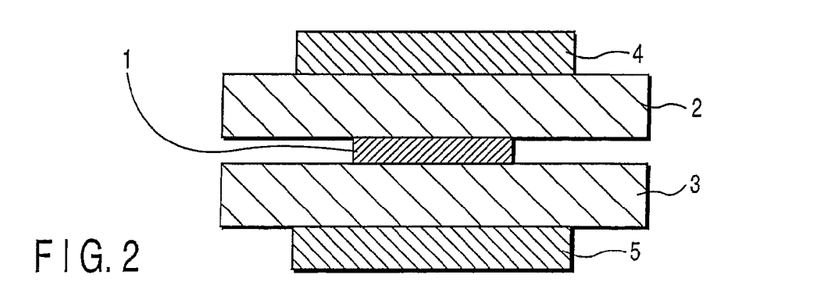
FIG. 2 is a front view of the magnetic head of FIG. 1 viewed from a plane which faces a medium.

FIG. 1 is a sectional view showing a first embodiment of a magnetic head according to the present invention. FIG. 2 is a front view of the magnetic head of FIG. 1 viewed from a plane which faces a medium. In FIGS. 1 and 2, a lower lead layer 5, a lower shielding layer 3, a magnetoresistance effect element 1, an upper shielding layer 2, and an upper lead layer 4 are laminated in this order on a substrate (not shown). A sense current is conducted between the upper lead layer 4 and the lower lead layer 5. That is, the sense current flows in a film thickness direction of the magnetoresistance effect element 1. Therefore, the magnetic head according to the present embodiment is a CPP type.

Metal conductors such as Cu, Au, and Ta are mainly usable in the lower lead layer 5 and the upper lead layer 4. In the first embodiment, Au is used. Soft magnetic materials such as NiFe and CoZrNb are mainly usable in the lower shielding layer 3 and the upper shielding layer 2. In the first embodiment, NiFe is used.

The magnetoresistance effect element 1 has a constitution in which, for example, a seed layer, an anti-ferromagnetic layer, a magnetic pinned layer, a spacer layer, a magnetic free layer, and a protective layer are laminated in this order. A metal magnetic material containing Ni, Fe, Co as main components is mainly usable in the magnetic free layer and the magnetic pinned layer. In the anti-ferromagnetic layer, PtMn, IrMn or the like is usable. In the seed layer, NiFeCr, Ta or the like is usable. In the protective layer, Ta, Ru or the like is usable.

In the spacer layer, a conductor such as Cu or Au, or a film constituted by oxidizing a Cu/Al/Cu laminated film is usable. When the spacer layer is constituted as a conductive layer, a so-called CPP-GMR head is formed. When the spacer layer is constituted as an insulating layer, a so-called TMR head is formed using the tunnel effect.

The magnetoresistance effect element 1 is formed in a width corresponding to a track width of a magnetic recording medium. On opposite sides of the magnetoresistance effect element 1, bias films (not shown) made of, for example, CoPt are disposed to hold therebetween an insulating film (not shown) made of, for example, alumina.

In the above-described constitution, the lead layers (reference numerals 4, 5) for current supply are formed outside the magnetic shielding layers (reference numerals 2, 3). Therefore, a distance between the upper and lower shielding layers can be kept to be small. Therefore, a gap length can be reduced which determines a resolution in a track longitudinal direction. That is, the resolution of the magnetic recording medium in the track longitudinal direction is set to be minute, so that the recording density can be enhanced.

Furthermore, in the above-described constitution, most of the sense current flows through the lead layers (upper lead layer 4 and lower lead layer 5). That is, portions where the sense current flows through the shielding layers (upper shielding layer 2 and lower shielding layer 3) are limited to upper and lower portions of the magnetoresistance effect element 1 in FIGS. 1, 2. Consequently, a ratio of the resistance brought by the shielding layer to the total resistance applied to the sense current can be reduced. Consequently, even when a disturbance magnetic field or the like acts on the magnetic head of FIG. 1 or 2, and magnetoresistance effects are generated in the upper shielding layer 2 and the lower shielding layer 3, a resistance change ratio can be reduced. Therefore, noises attributed to the magnetoresistance effects of the shielding layers are reduced, and the signal-to-noise ratio of an output can be enhanced.

Figure 3:
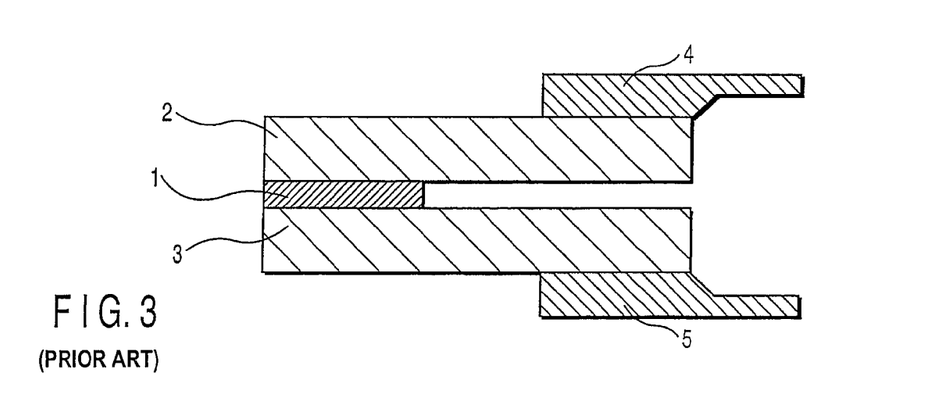
FIG. 3 is a sectional view showing a magnetic head for comparison.

FIG. 3 is a sectional view showing a magnetic head for comparison. In the magnetic head of FIG. 3, the upper lead layer 4 does not reach a portion where the magnetoresistance effect element 1 is superimposed on the upper shielding layer 2. Similarly, the lower lead layer 5 does not reach a portion where the magnetoresistance effect element 1 is superimposed on the lower shielding layer 3. Therefore, the sense current flows through a considerable part of the shielding layer, and the ratio of the resistance brought by the shielding layer to the total resistance applied to the sense current increases.

Therefore, when the disturbance magnetic field or the like acts on the magnetic head of FIG. 3, and the magnetoresistance effects are produced in the upper shielding layer 2 and the lower shielding layer 3, the resistance change ratio indicates a value which cannot be ignored. Therefore, since the noises attributed to the magnetoresistance effects of the shielding layers are large, the signal-to-noise ratio of the output is deteriorated.

Figure 4:
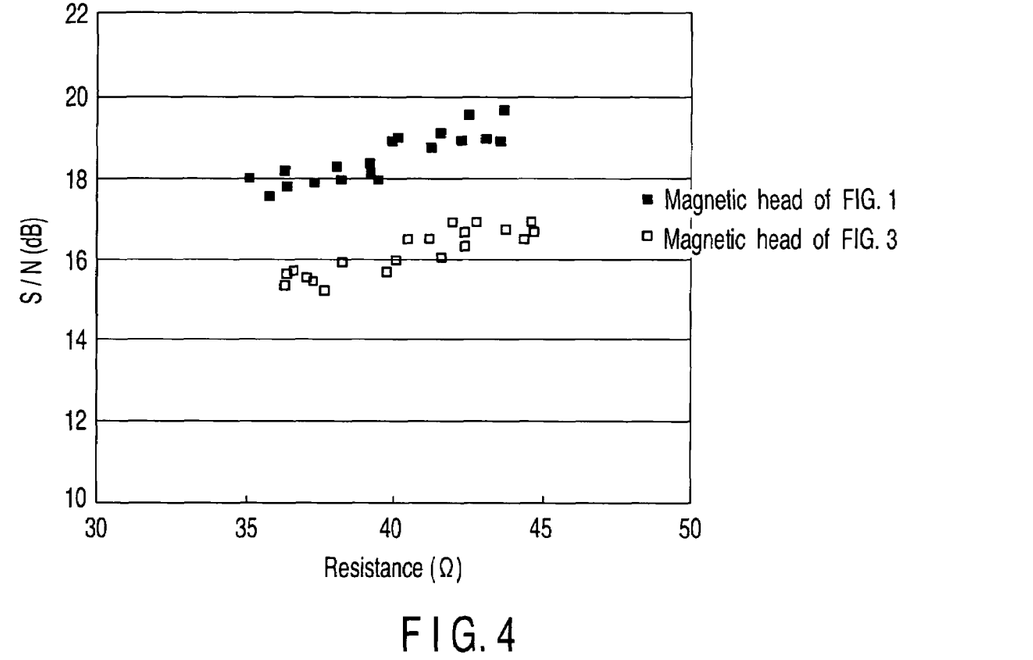
FIG. 4 is a graph showing effects obtained by the present invention.

FIG. 4 is a graph showing effects obtained by the present invention. The signal-to-noise ratios of reproduced output from the magnetic recording medium are measured on the same conditions with respect to the magnetic heads of FIG. 1 (FIG. 2) and FIG. 3, and results of the measurement are plotted with respect to the resistance value of the magnetic head in this graph. With respect to each type of magnetic head, 20 heads were prepared. The magnetic recording medium was set to Hc=4500 Oe, Mrt=0.3 menu/cm$^2$. Assuming a float-up amount of the magnetic head=5 nm, sense current=3 mA, the signal-to-noise ratios were measured.

It is seen from FIG. 4 that the signal-to-noise ratio of the existing magnetic head is 15 to 17 dB, whereas the signal-to-noise ratio of the magnetic head according to the present invention is 17 to 20 dB. Consequently, it has been proved that, according to the present invention, it is possible to enhance the signal-to-noise ratio of the reproduced outputs from the magnetic recording medium.

Second Embodiment

Figure 5:
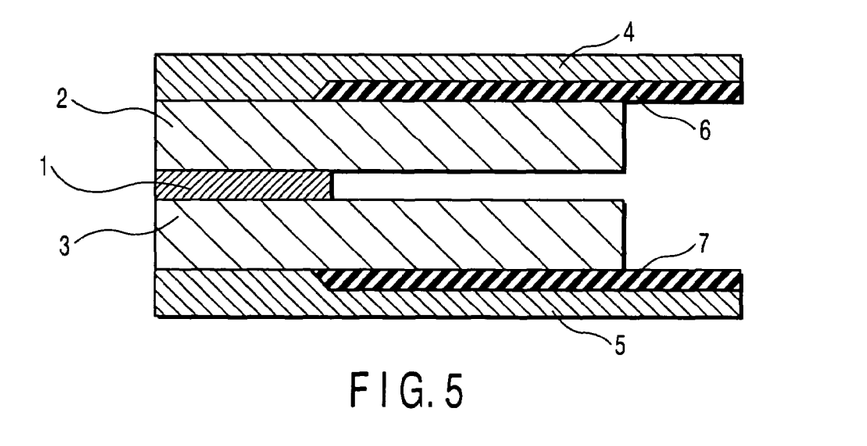
FIG. 5 is a sectional view showing a second embodiment of the magnetic head according to the present invention.

FIG. 5 is a sectional view showing a second embodiment of the magnetic head according to the present invention. It is to be noted that, in FIG. 5, parts common to those of FIG. 1 are denoted with the same reference numerals, and a different part only will be described here. In FIG. 5, an insulating film 6 is laminated between an upper lead layer 4 and an upper shielding layer 2. The insulating film 6 allows the upper lead layer 4 and the upper shielding layer 2 to be energized only in a portion from a medium-facing surface to the vicinity of the height edge of the magnetoresistance effect element 1. Similarly, an insulating film 7 is laminated between a lower lead layer 5 and a lower shielding layer 3. The insulating film 7 allows the lower lead layer 5 and the lower shielding layer 3 to be energized only in the portion from the medium-facing surface to the vicinity of the height edge of the magnetoresistance effect element 1. In the insulating films 6, 7, AlOx or SiOx is usable, and in the second embodiment, AlOx is used.

When the insulating films 6, 7 are provided, a range in which a sense current flows is further limited. That is, the sense current flows only in a portion in which the upper shielding layer 2 and the lower shielding layer 3 are superimposed on the magnetoresistance effect element 1. Therefore, according to the second embodiment, since influences by magnetoresistance effects of the upper shielding layer 2 and the lower shielding layer 3 can further be reduced, it is possible to enhance the signal-to-noise ratio of a reproduced output.

Third Embodiment

Figure 6:
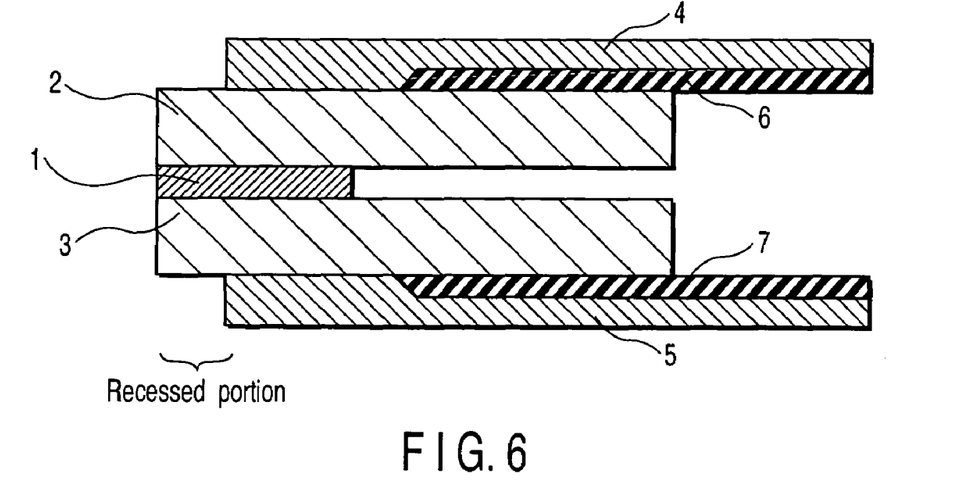
FIG. 6 is a sectional view showing a third embodiment of the magnetic head according to the present invention.

FIG. 6 is a sectional view showing a third embodiment of the magnetic head according to the present invention. In FIG. 6, an upper lead layer 4 and a lower lead layer 5 are slightly recessed from a medium-facing surface. In the upper lead layer 4 and the lower lead layer 5, Cu is often used, but Cu is inferior in resistance to corrosion. Therefore, when the lead layers are exposed on the medium-facing surface, they are sometimes corroded at a height lapping. Therefore, when the upper lead layer 4 and the lower lead layer 5 are recessed from the medium-facing surface as shown in FIG. 6, the corrosion at the height lapping can be prevented.

Fourth Embodiment

Figure 7:
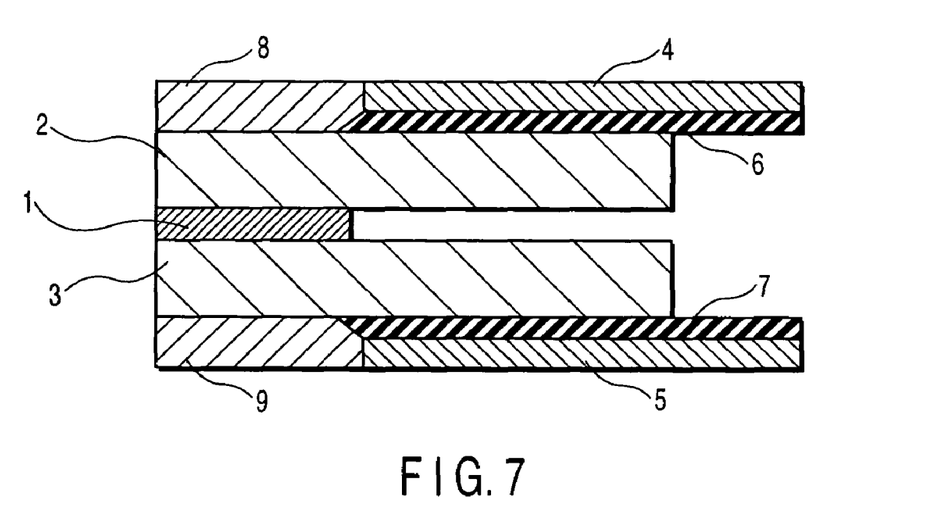
FIG. 7 is a sectional view showing a fourth embodiment of the magnetic head according to the present invention.

FIG. 7 is a sectional view showing a fourth embodiment of the magnetic head according to the present invention. In FIG. 7, the recessed portion of FIG. 6 is further recessed from a medium-facing surface, and materials 8 and 9 superior in resistance to corrosion, such as Ta, are provided in this recessed portion. In general, Ta indicates a resistance higher than that of Cu or the like. However, when Ta is used only in a tip portion of the magnetic head as shown in FIG. 7, an entire resistance rise is remarkably small. Even by this constitution, it is possible to prevent the corrosion of lead layers at a height lapping in the same manner as in FIG. 6.

Figure 8:
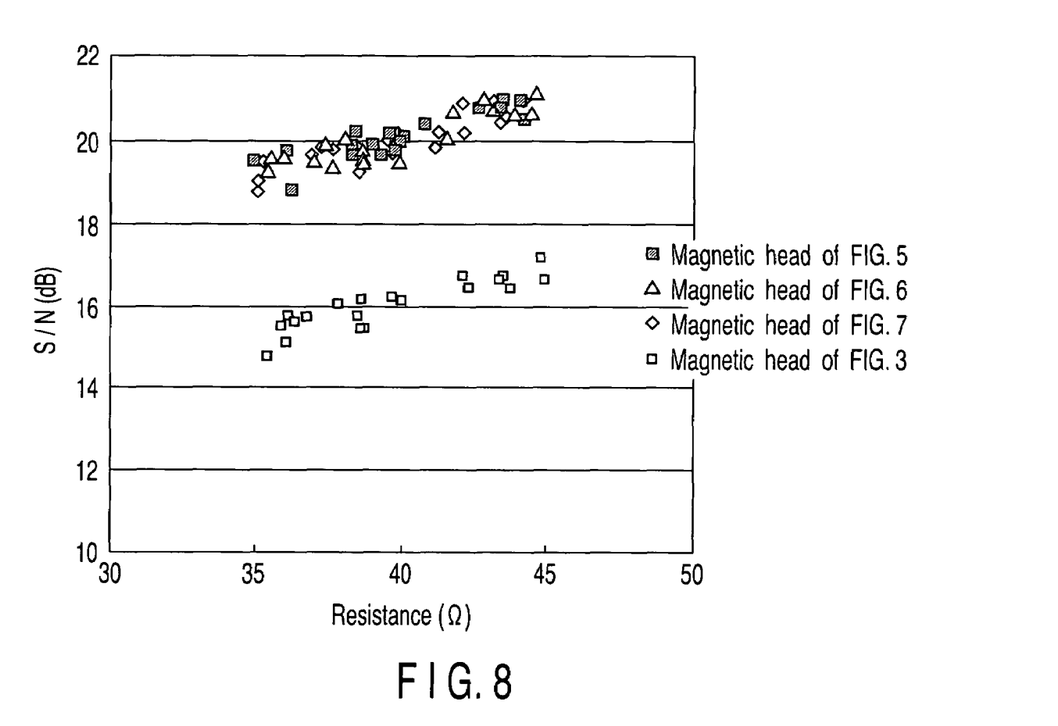
FIG. 8 is a second graph showing the effects obtained by the present invention.

FIG. 8 is a second graph showing effects obtained by the present invention. In any one of magnetic heads of FIGS. 5 to 7, noises attributed to magnetoresistance effects of shielding layers can be reduced. To prepare the graph of FIG. 8, 20 samples were prepared for each of the magnetic heads shown in FIGS. 5 to 7, and 3 on the same conditions as those of FIG. 4. In the graph, signal-to-noise ratios of reproduced outputs are plotted with respect to resistances of the samples of the magnetic heads.

It is seen from FIG. 8 that the signal-to-noise ratio of any of the magnetic heads of FIGS. 5 to 7 is 19 to 21 dB, and results are obtained which are more satisfactory than those of the magnetic head of the first embodiment. Therefore, it has been proved that, according to any one of the second to fourth embodiments, it is possible to raise the signal-to-noise ratio of the reproduced output from the magnetic recording medium.

Figure 9:
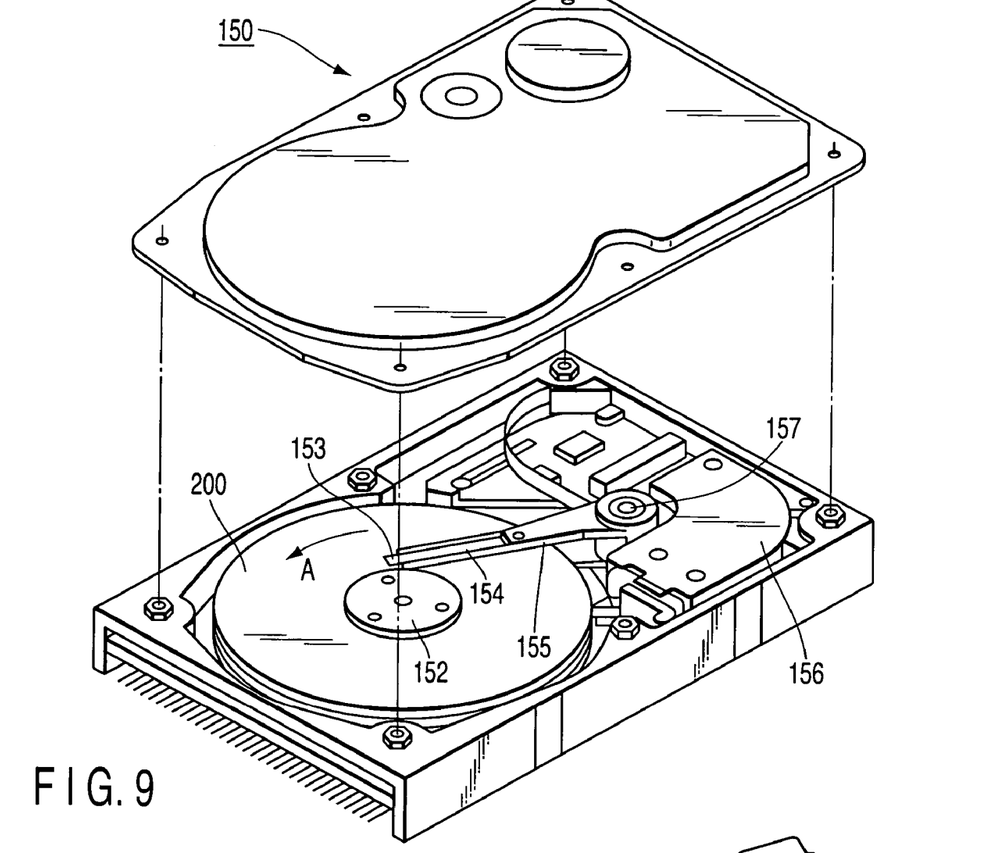
FIG. 9 is an appearance perspective view showing a hard disk drive on which the magnetic head can be mounted according to the embodiments of the present invention.

FIG. 9 is an appearance perspective view showing a hard disk drive on which the magnetic head can be mounted according to the embodiment of the present invention. The magnetic head according to the present invention can be mounted on a magnetic reproduction apparatus which reads digital data magnetically recorded in the magnetic recording medium. As the magnetic recording medium, a platter built in a hard disk drive is representative. Furthermore, the magnetic head of the present invention may be mounted on a magnetic recording/reproducing apparatus which also has a function of writing digital data in the magnetic recording medium.

In a hard disk drive 150 of FIG. 9, the magnetic head is moved using a rotary actuator. In FIG. 9, a disc medium 200 for recording is attached to a spindle 152. This disc medium 200 is rotated/driven in the direction of arrow A by a motor (not shown) which responds to a control signal from a driving device control unit (not shown). It is to be noted that a plurality of disc mediums 200 may be provided, and this type of apparatus is referred to as a plural platter type.

A head slider 153 is attached to a tip of a thin-film-like suspension 154 so that information is stored in the disc medium 200, or information recorded in the disc medium 200 is reproduced. The magnetic head of any of FIGS. 1 and 5 to 7 is mounted in the vicinity of the tip of the head slider 153.

When the disc medium 200 rotates, a medium-facing surface of the head slider 153 floats up from the surface of the disc medium 200 by a certain height. It is to be noted that the magnetic head of the present invention is also applicable to a so-called contact running type apparatus whose slider is brought into contact with the disc medium 200.

The suspension 154 is connected to one end of the actuator arm 155 having a bobbin section (not shown) which holds a driving coil (not shown). A voice coil motor 156 which is one type of linear motor is disposed on the other end of the actuator arm 155. A voice coil motor 156 comprises: the driving coil (not shown) wound up on the bobbin section of the actuator arm 155; and a magnetic circuit in which a permanent magnet is disposed facing an opposed yoke in such a manner as to hold the coil therebetween.

The actuator arm 155 is held by ball bearings (not shown) disposed on two upper and lower portions of a spindle 157, and is slidably rotated by the voice coil motor 156.

Figure 10:
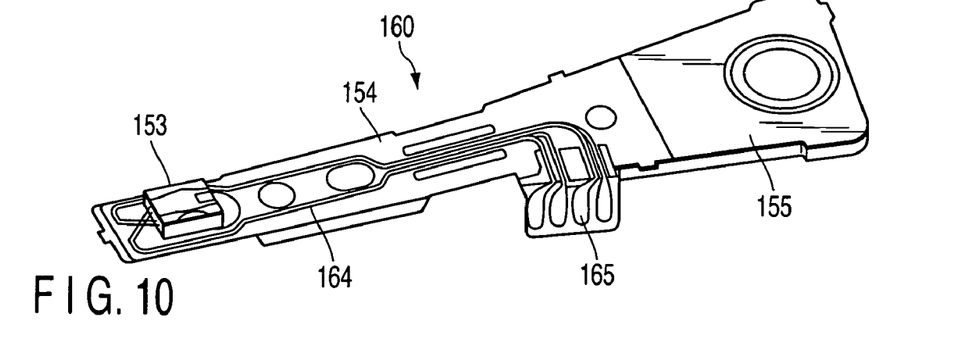
FIG. 10 is an enlarged perspective view of a tip portion from an actuator arm 155 of a magnetic head assembly 160 in the hard disk drive of FIG. 9.

FIG. 10 is an enlarged perspective view of a tip portion from the actuator arm 155 of the magnetic head assembly 160 in the hard disk drive of FIG. 9 viewed from a medium side. In FIG. 10, the magnetic head assembly 160 has the actuator arm 155. One end of the actuator arm 155 is connected to the suspension 154. The head slider 153 is attached to the tip of the suspension 154. The suspension 154 has a lead wire 164 for writing and reading a signal. The lead wire 164 is electrically connected to each electrode of the magnetic head incorporated in the head slider 153. The lead wire 164 is also connected to electrode pads 165.

As shown in FIGS. 9 and 10, when the hard disk drive is implemented using any of the magnetic heads of FIGS. 1 and 5 to 7, it is possible to obtain a reproduced output having less noise as compared with the existing hard disk drive. Additionally, magnetic recording density is further enhanced, and a further increase of recording capacity can be promoted.

As described above, according to the embodiment of the present invention, when the upper lead layer 4 and the lower lead layer 5 are formed outside the upper shielding layer 2 and the lower shielding layer 3, respectively, gap length can be reduced to enhance the recording density of the magnetic recording medium. Furthermore, since the upper lead layer 4 and the lower lead layer 5 are extended toward the medium-facing surface, it is possible to reduce the range in which the sense current flows through the upper shielding layer 2 and the lower shielding layer 3, and it is possible to reduce noise by the magnetoresistance effects of the upper shielding layer 2 and the lower shielding layer 3. Furthermore, since the insulating films 6, 7 are laminated, the range in which the sense current flows can further be reduced to reduce the noise further. Consequently, there can be provided a magnetic head, a head suspension assembly, and a magnetic reproduction apparatus in which the noise components by the disturbance magnetic field are reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A magnetic head which is provided with a magnetoresistance effect element where a plurality of magnetic films are laminated and which conducts a sense current in a film thickness direction of the magnetoresistance effect element, the magnetic head comprising:

a first shielding layer which is superimposed on one surface of the magnetoresistance effect element and whose area is larger than that of this one surface;

a first lead layer which is formed ranging from a portion where the first shielding layer is superimposed on the magnetoresistance effect element to another portion on the first shielding layer and which applies the sense current to the magnetoresistance effect element;

a second shielding layer which is superimposed on another surface of the magnetoresistance effect element opposite to the one surface and whose area is larger than that of the other surface;

a second lead layer which is formed ranging from a portion where the second shielding layer is superimposed on the magnetoresistance effect element to another portion on the second shielding layer and which applies the sense current to the magnetoresistance effect element;

a first insulating film which insulates a part of a contact surface between the first shielding layer and the first lead layer; and a second insulating film which insulates a part of a contact surface between the second shielding layer and the second lead layer.

2. The magnetic head according to claim 1, wherein the first insulating film insulates a portion other than the portion where the first shielding layer is superimposed on the magnetoresistance effect element in the contact surface between the first shielding layer and the first lead layer, and the second insulating film insulates a portion other than the portion where the second shielding layer is superimposed on the magnetoresistance effect element in the contact surface between the second shielding layer and the second lead layer.

3. The magnetic head according to claim 1, wherein the first shielding layer, the magnetoresistance effect element, and the second shielding layer share the same plane, and face a magnetic recording medium via the plane, and the first lead layer and the second lead layer are recessed from the plane, and face the magnetic recording medium.

4. The magnetic head according to claim 3, wherein members whose compositions are different from those of the first and second lead layers are formed in portions where the first and second lead layers are recessed from the plane.

5. A head suspension assembly comprising:

a magnetic head provided with a magnetoresistance effect element where a plurality of magnetic films are laminated and which conducts a sense current in a film thickness direction of the magnetoresistance effect element, the magnetic head including:

a first shielding layer which is superimposed on one surface of the magnetoresistance effect element and whose area is larger than that of this one surface;

a first lead layer which is formed ranging from a portion where the first shielding layer is superimposed on the magnetoresistance effect element to another portion on the first shielding layer and which applies the sense current to the magnetoresistance effect element;

a second shielding layer which is superimposed on another surface of the magnetoresistance effect element opposite to the one surface and whose area is larger than that of the other surface;

a second lead layer which is formed ranging from a portion where the second shielding layer is superimposed on the magnetoresistance effect element to another portion on the second shielding layer and which applies the sense current to the magnetoresistance effect element;

a first insulating film which insulates a part of a contact surface between the first shielding layer and the first lead layer;

a second insulating film which insulates a part of a contact surface between the second shielding layer and the second lead layer; and a support mechanism which supports the magnetic head in such a manner that the magnetic head faces a recording surface of a magnetic recording medium.

6. The head suspension assembly of claim 5, wherein
the first insulating film insulates a portion other than the portion where the first shielding layer is superimposed on the magnetoresistance effect element in the contact surface between the first shielding layer and the first lead layer, and the second insulating film insulates a portion other than the portion where the second shielding layer is superimposed on the magnetoresistance effect element in the contact surface between the second shielding layer and the second lead layer.

7. The head suspension assembly of claim 5, wherein
the first shielding layer, the magnetoresistance effect element, and the second shielding layer share the same plane, and face a magnetic recording medium via the plane, and the first lead layer and the second lead layer are recessed from the plane, and face the magnetic recording medium.

8. The head suspension assembly of claim 7, wherein
members whose compositions are different from those of the first and second lead layers are formed in portions where the first and second lead layers are recessed from the plane.

9. A magnetic reproduction apparatus which reads magnetic information recorded in a magnetic recording medium by use of a magnetic head, comprising:

head suspension assembly including:

a magnetic head provided with a magnetoresistance effect element where a plurality of magnetic films are laminated and which conducts a sense current in a film thickness direction of the magnetoresistance effect element, the magnetic head including:

a first shielding layer which is superimposed on one surface of the magnetoresistance effect element and whose area is larger than that of this one surface;

a first lead layer which is formed ranging from a portion where the first shielding layer is superimposed on the magnetoresistance effect element to another portion on the first shielding layer and which applies the sense current to the magnetoresistance effect element;

a second shielding layer which is superimposed on another surface of the magnetoresistance effect element opposite to the one surface and whose area is larger than that of the other surface;

a second lead layer which is formed ranging from a portion where the second shielding layer is superimposed on the magnetoresistance effect element to another portion on the second shielding layer and which applies the sense current to the magnetoresistance effect element;

a first insulating film which insulates a part of a contact surface between the first shielding layer and the first lead layer;

a second insulating film which insulates a part of a contact surface between the second shielding layer and the second lead layer; and a support mechanism which supports the magnetic head in such a manner that the magnetic head faces a recording surface of a magnetic recording medium.

10. The magnetic reproduction apparatus of claim 9, wherein
the first insulating film insulates a portion other than the portion where the first shielding layer is superimposed on the magnetoresistance effect element in the contact surface between the first shielding layer and the first lead layer, and the second insulating film insulates a portion other than the portion where the second shielding layer is superimposed on the magnetoresistance effect element in the contact surface between the second shielding layer and the second lead layer.

11. The magnetic reproduction apparatus of claim 9, wherein the first shielding layer, the magnetoresistance effect element, and the second shielding layer share the same plane, and face a magnetic recording medium via the plane, and the first lead layer and the second lead layer are recessed from the plane, and face the magnetic recording medium.

12. The magnetic reproduction apparatus of claim 11, wherein members whose compositions are different from those of the first and second lead layers are formed in portions where the first and second lead layers are recessed from the plane.

* * * * *